United States Patent [19]

Hahn et al.

[11] 4,267,653
[45] May 19, 1981

[54] LOCKING DEVICE FOR EXCAVATING EQUIPMENT

[75] Inventors: Frederick C. Hahn; Larren F. Jones, both of Beaverton, Oreg.

[73] Assignee: ESCO Corporation, Portland, Oreg.

[21] Appl. No.: 112,160

[22] Filed: Jan. 16, 1980

[51] Int. Cl.³ .............................................. E02F 9/28
[52] U.S. Cl. .................. 37/142 A; 403/379; 403/318
[58] Field of Search ......................... 37/142 A, 142 R; 403/379, 316, 318; 85/813; 299/92

[56] References Cited

U.S. PATENT DOCUMENTS

| 2,919,506 | 1/1960 | Larsen | 37/142 A |
| 3,121,289 | 2/1964 | Eyolfson | 403/355 X |
| 3,126,654 | 3/1964 | Eyolfson et al. | 37/142 A |
| 3,572,785 | 3/1971 | Larson | 403/374 |
| 3,722,932 | 3/1973 | Dougall | 403/379 |
| 3,839,806 | 10/1974 | Hood | 37/142 R |
| 4,061,432 | 12/1977 | Hahn | 403/379 X |

Primary Examiner—Andrew V. Kundrat
Attorney, Agent, or Firm—Tilton, Fallon, Lungmus & Chestnut

[57] ABSTRACT

A C-clamp and wedge for releasably locking a slip-over adapter to the lip of a shovel dipper or like piece of excavating equipment wherein the serratons on the wedge are interlocked with serrations on a resilient lock member received within the clamp and uniquely stabilized by confining sidewalls on the clamp.

9 Claims, 3 Drawing Figures

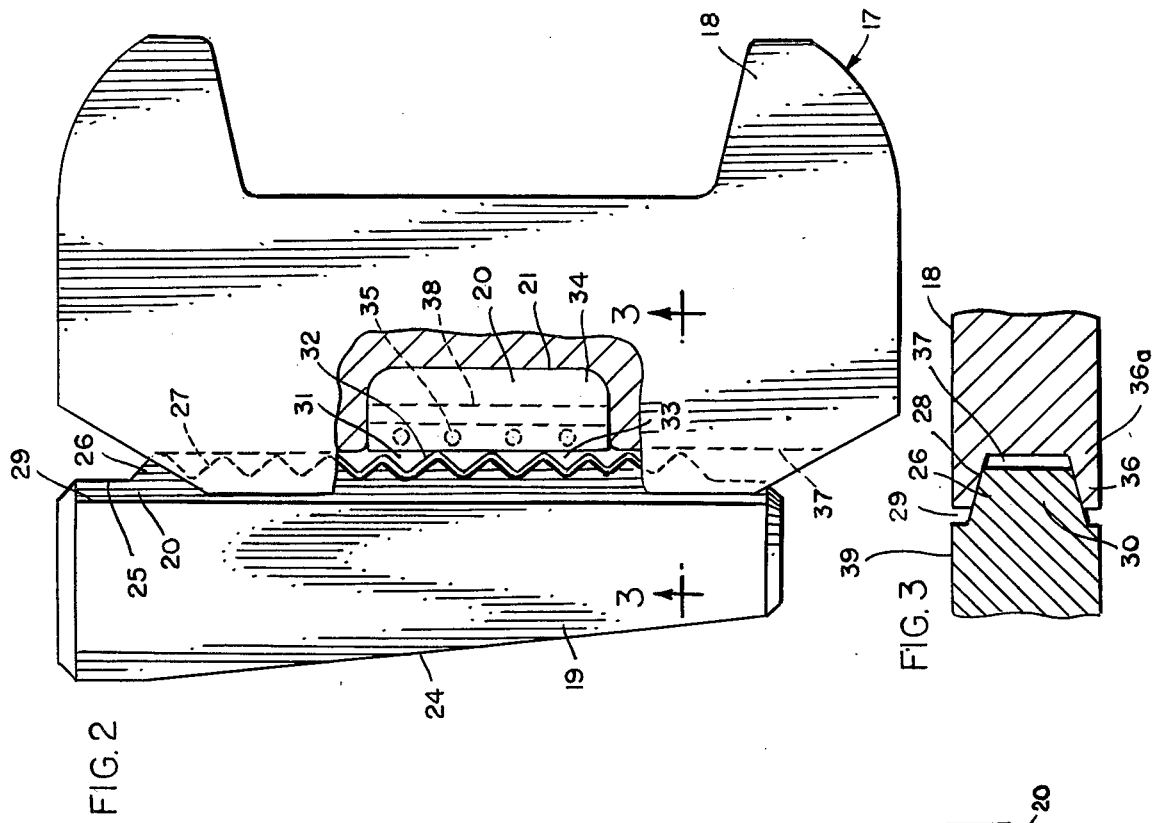
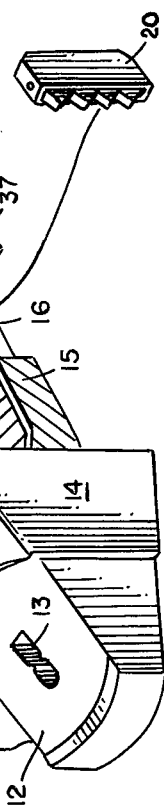
FIG. 1
FIG. 2
FIG. 3

LOCKING DEVICE FOR EXCAVATING EQUIPMENT

BACKGROUND AND SUMMARY OF INVENTION:

This invention relates to a locking device for excavating equipment and, more particularly, to a releasable lock for securing a slip-over adapter to the lip of a shovel dipper or the like.

For over a century, excavating equipment has been equipped with forward projections generally referred to as teeth to facilitate penetration of the earth being worked. For many years these were either bolted or welded onto the lip of the excavating bucket or dipper. In the early 1900's, workers in this art appreciated the need for renewing these wedge-shaped teeth and worked on a number of variations of 2-piece teeth wherein there would be a minimum amount of throwaway metal. For many years the difficulty lay in providing a suitable interlock between the two parts of the tooth—one that would hold the forwardly-extending point securely on the rearwardly-extending adapter (which in turn was attached to the excavating equipment) at times of stress, yet could be easily disassembled for replacement.

The first successful two-part tooth which was widely used throughout the world is seen in U.S. Pat. No. 2,483,032. There a notched tapered locking pin was engaged by a metal faced rubber locking plug housed within the adapter. Since that time, a great deal of attention has been focused on the locking devices which hold the point on the adapter, particularly the notch or notches that engage the resilient element. However, there has not been the same attention paid to the means for securing the adapter to the dipper, bucket, etc. Many times, workers in the art have thought that the lock between the point and adapter could be utilized (with suitable enlargement) to connect the adapter to the excavator lip. This has not proved the case because the stresses were different and the masses of material involved in the connected elements adjacent the lock were also quite different. Normally, the adapter has substantially greater mass than the point, often weighing three to four times as much.

The adapters, at their rearward ends which were secured to the excavator lip, normally partook of two basic shapes—the so-called "Whisler" adapter which had bifurcated arms so as to slip over the lip, and the shank type adapter (see U.S. Pat. No. 2,919,506) which fitted within a recess within the forward edge of the lip.

As far as the Whisler type adapter was concerned, early on the workers in this art favored a C-shaped clamping member suitably held in place by a lock—see, for example, U.S. Pat. No. 3,121,289—and it is with this general type of adapter with which the instant invention is concerned. With larger excavating machines and therefore the greater stresses encountered particularly where the Whisler-type adapter was favored, it became apparent to those in the art that better locks were required between the adapter and the excavator lip because adapters had to be replaced more often. One attempt to bring serrated surfaces, i.e., a plurality of locking surfaces, into the design of the lock is seen in U.S. Pat. No. 3,121,289. This has proved successful in some instances but not universally effective, particularly where large stresses are encountered.

Coincident with the development of the serrations pictured in the '289 patent, the art workers were concerned with various types of corrugated locks (alternatively, more notches) to secure the point to the adapter—see, for example, U.S. Pat. Nos. 2,919,506 and 3,126,654.

The concept of using the horizontal corrugations of the point locks of the '506 and '564 was attempted to be translated into use for securing adapters to excavator lips— as in U.S. Pat. Nos. 3,572,785 and 3,722,932. However, these have not been widely used, there being the feeling that the concepts useful in releasably locking points on adapters were not suitable on the larger stress area where the adapters are releasably locked onto the excavator lips.

It was therefore surprising to discover that certain elements of a point lock—as seen in our earlier U.S. Pat. No. 4,061,432—could be used to advantage in achieving a reliable, sturdy lock for securing the adapter to the excavator lip.

According to the instant invention, a C-clamp member is employed in combination with the traditional wedge member. The wedge member is serrated for engagement with a lock element fitted within a recess in the confronting face of the C-shaped clamp member. Additionally, the C-shaped clamp member in the confronting face portion is slotted to provide opposing side walls which confine the confronting serrations of the wedge member against lateral movement and thereby stabilize the connection between the two so as to achieve an unexpectedly strong and reliable lock.

DETAILED DESCRIPTION

The invention is described in conjunction with an illustrative embodiment in the accompanying drawing, in which FIG. 1 is a fragmentary perspective view of equipment utilizing the inventive lock and wherein the lock is seen in the process of being assembled;

FIG. 2 is a side elevational view of the lock itself, partially broken away to show the interior workings; and FIG. 3 is an enlarged fragmentary sectional view such as would be seen along the sight line 3—3 applied to FIG. 2.

In the illustration given and with reference first to FIG. 1, the numeral 10 designates generally the lip of an excavating machine such as a shovel dipper or the like. Shown straddling the lip 10 having an opening 10a is an adapter 11 equipped with the usual point-receiving nose 12 and further equipped with a vertically extending opening 13 for the receipt of the lock (not shown) for securing a point to the adapter.

Extending rearwardly from the massive section 14 of the adapter 11 are legs 15 which flank the upper and lower surfaces of the excavator lip 10. The legs 15 are equipped with openings 16 for the receipt of the releasable lock generally designated 17 and which is seen in assembled condition in FIG. 2.

The lock 17 includes a C-shaped clamping member 18, a tapered or wedge member 19 and a resilient lock 20. More particularly, the lock 20 is first mounted in a recess 21 provided in the confronting face 22 of the clamp member 18. Thereafter, the clamp member 18 is installed within the aligned openings 16, 10a and about the lip 10 in the fashion depicted in FIG. 1. Once this arrangement is achieved, the wedge member 19 is driven into the remaining portion of the openings 16 and 10a by virtue of force exerted through a hammer, sledge, etc. designated H in FIG. 1.

The wedge member 19 is seem to be vertically elongated and is tapered by having the forward wall 24 downwardly convergent relative to the rearwardly facing (and confronting) wall 25. The confronting wall 25 is equipped with a series of crests and valleys as at 26 and 27, respectively. These are rearwardly tapered as at 28 in FIG. 3. More particularly, the rearwardly facing portion of the wedge member 19 can be considered to be transversely constricted as at 29 to provide a tapered flange portion 30 in which the crests and valleys 26 and 27 are developed. Advantageous results are obtained when the crests and valleys are defined by angularly related, intersected planar surfaces (best seen in the central portion of FIG. 2).

The lock member 20 also includes an elongated body which in the forwardly facing portion thereof is constructed of metal to define a plurality of cooperating crests and valleys as at 31 and 32. Bonded to the metal portion 33 of the lock member 20 is a resilient portion 34 and wherein the bonding is achieved by the rubber or like resilient material flowing through openings 35 in the metal portion 33.

As indicated previously, the confronting face 22 of the C-shaped clamp member 18 is equipped with confining walls 36 (see particularly FIG. 3) which embrace and restrict movement of the flange part 30. The walls 36 are developed by a longitudinally extending groove or slot 37 in the confronting face 22.

Additionally, the resilient portion 35 of the block 20 is equipped with a longitudinally extending bore 38 which enables the steel-rubber block 20 to compress back into the cavity or recess 21 whenever the wedge member 19 moves one-half a notch. Thereafter, the lock member 20 expands back to its original position when the movement equals one full notch. The advantage of the invention over currently used fluted C-clamp and wedge members is that the notches provided by the crests and valleys and the steel-rubber insert lock act in conjunction with the sidewalls 36 to prevent the wedge from coming up and out during service, especially under shock loading conditions.

Advantageously, the sidewalls 36 developed by the groove or slot 37 are disposed at an angle of about 20° to 30° relative to the outwardly facing sidewalls of the clamp member 18 (as at 28 in FIG. 3). Correspondingly, the sidewalls on the flange portion 30 are also tapered—being rear-wardly convergent relative to each other and presenting, in effect, a trapezoidal cross section when viewed in plan. This provides a relatively massive section 36a at the base of each sidewall 36 so as to effectively resist any lateral shifting of the serrations on the wedge member 19. Here, it should be appreciated that with large stresses, there can be substantial deformation of the teeth and what might seem to be a relatively close fit in the unloaded state often becomes loose to the extent of permitting detachment of tooth parts from the excavating machinery. This is effectively avoided through the practice of the invention through the provision of the stabilizing sidewalls and, more particularly, the more substantial thickness at the bases thereof.

Notwithstanding the foregoing, it is still advantageous to provide as close a fit as is possible with the use of cast elements. Therefore we provide sidewardly facing walls 38 and 39 (see FIG. 3) on the clamp and wedge members, respectively. In addition, the lock element 20 is also equipped with planar sidewalls to fit within the correspondingly contoured walls of the recess 21.

Although the invention has been disclosed with reference to a particular type of slip-over adapter with which excellent results have been achieved in the field, it will be apparent to those skilled in the art that the inventive locking device may be employed advantageously with other types of earth working equipment. For example, a common variant of the Whisler type adapter is to provide the upper leg longer than the lower leg with only the upper leg being equipped with an opening aligned with the opening in the excavating tooth lip.

While in the foregoing specification a detailed description of an embodiment of the invention has been set down for the purpose of illustration, many variations in the details hereingiven may be made by those skilled in the art without departing from the spirit and scope of the invention.

We claim:

1. A locking device for securing a slip-over forwardly projecting adapter to an excavator lip comprising a C-clamp member straddling said lip while extending through vertically aligned openings in said adapter and lip, and a wedge member also extending through said aligned openings and forwardly of said clamp member, said clamp member having a forward facing wall confronting said wedge member and having a forwardly facing recess in said forward wall, a resilient lock element having forwardly facing horizontal serrations in said recess, said wedge member having a rearwardly facing wall with rearwardly facing serrations releasably lockable with the lock element serrations, said clamp member forward wall having a vertical slot therein developing forwardly projecting sidewalls, said wedge member in the portion adjacent said rearwardly facing wall being received in said slot whereby said sidewalls cooperate with said wedge member portion and stabilizing the lockable engagement of said serrations.

2. The device of claim 1 in which said slot is generally trapezoidal when viewed in plan to provide forwardly tapered sidewalls, said wedge member portion being complementarily contoured whereby said sidewalls provide substantial strength at the bases thereof against horizontal movement of said wedge member serrations.

3. The device of claim 2 in which said serrations are crests and valleys developed by intersecting planar surfaces.

4. The device of claim 1 in which said resilient lock element has a rectangular shape in horizontal section and includes a forward part constructed of metal and a rearward part constructed of resilient material, said parts being bonded together.

5. The structure of claim 1 in which said C-clamp member has sidewardly facing walls generally co-planar with sidewardly facing walls on said wedge member when the members are in assembled condition.

6. The device of claim 5 in which the sidewalls of said slot are arranged at an angle of about 20° to about 30° relative to said sidewardly facing walls of said clamp member.

7. In combination, an excavating device providing a forwardly extending lip, an adapter on said lips and having legs straddling said lip, aligned openings extending through said adapter legs and lip, a locking device in said aligned openings and comprising a C-clamp member straddling said lip while extending through said vertically aligned openings and a wedge member also extending through said aligned openings forwardly of said clamp member, said clamp member having a forwardly facing wall confronting said wedge member and having a forwardly facing recess in said forward wall, a resilient lock element having forwardly facing horizontal serrations in said recess, said wedge member having a rearwardly facing wall with rearwardly facing serrations releasably lockable with a lock element serrations, said clamp member forward wall having a vertical slot therein defining forwardly projecting sidewalls, said wedge member and the portion adjacent said rearwardly facing wall being received in said slot, said wedge member portion defining sidewalls, each of which is rearwardly convergent at an angle of about 20° to 30° relative to the outwardly facing sidewalls of said wedge member, said slot being complementarily contoured whereby the sidewalls of said slot cooperate with the wedge member sidewalls in stabilizing the lockable engagement of said serrations and the shape of said sidewalls of said slot provide substantial strength at the base thereof.

8. A releasable lock for a slip-over adapter for a shovel dipper comprising a wedge member and a C-clamp member, said members being matable within openings in said adapter and dipper to releasably lock the same together, said C-clamp member including a unitary, elongated metal body having rearwardly facing end projections to define a C-shape in elevation, the front face of said C-clamp member being equipped with a longitudinally extending slot providing opposed sidewalls, said wedge member including a unitary elongated metal body having a rearwardly facing flange slidably received in said slot, said flange being equipped with a plurality of alternating crests and valleys defined by intersecting planar surfaces, said wedge member having a forwardly facing surface inclined relative to said flange to provide a wedge shape in elevation, said slot being centrally longitudinally recessed and a resilient lock element in said recess, said lock element including an elongated block having forwardly facing crests and valleys contoured to mate with the valleys and crests of said wedge member, said block having a forwardly facing metal portion providing said crests and valleys thereof and resilient material rearwardly thereof, and a longitudinally extending bore in said resilient material to permit engagement and disengagement of said crests and valleys on said wedge member and lock element, said opposed sidewalls stabilizing said flange to limit releasing movement of said wedge member.

9. The structure of claim 8 in which said sidewalls are rearwardly convergent and in which the crests on said wedge member are correspondingly contoured.

* * * * *